ABSTRACT OF THE DISCLOSURE

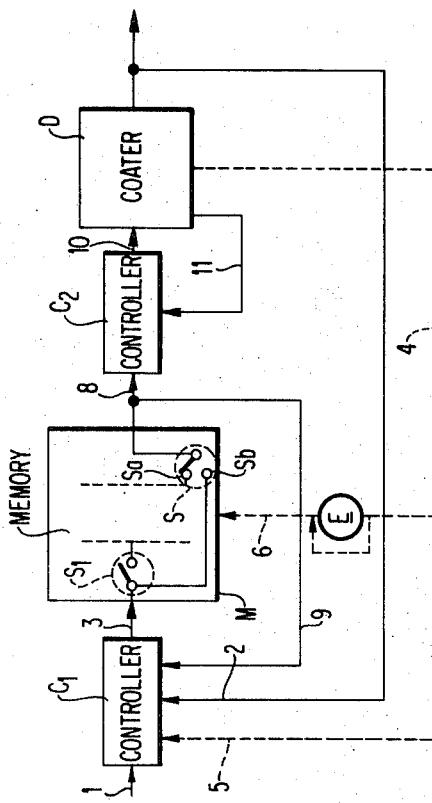
FIG. 3
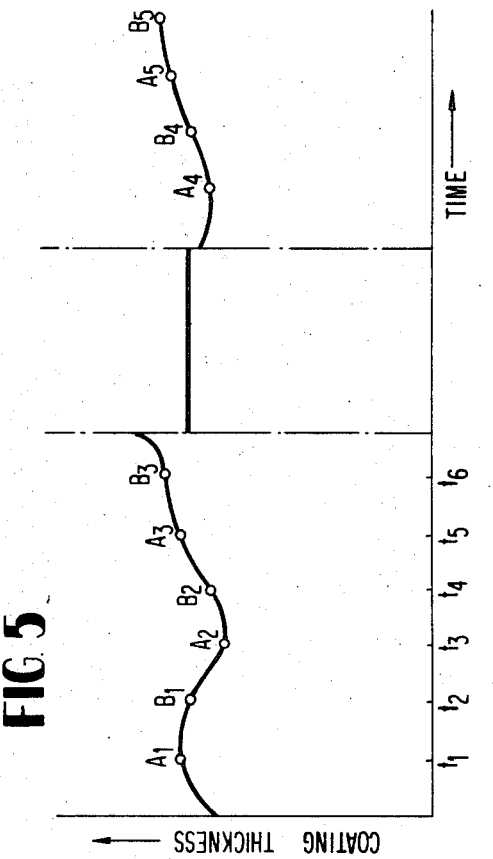
FIG. 5
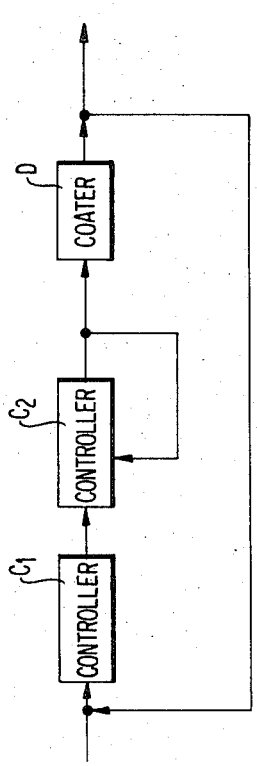
FIG. 1 (PRIOR ART)
FIG. 2
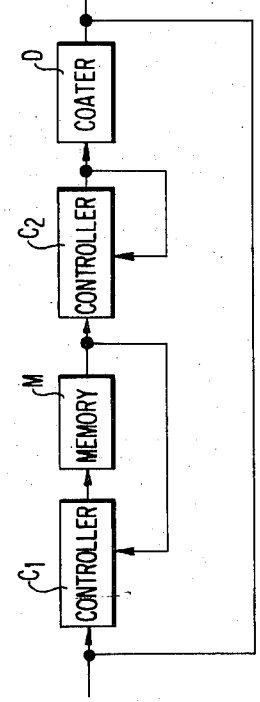
FIG. 4
INVENTORS
HIROSI HIYOSI
MASAO KANDA
BY Sughrue, Rothwell, Mion, Zinn & Macpeak
ATTORNEYS 3,700,490
METHOD OF COATING BY DELAYING THE CONTROL SIGNAL FOR OPERATING THE COATING APPARATUS
Hirosi Hiyosi and Masao Kanda, Shizuoka, Japan, assignors to Fuji Photo Film Co. Ltd., Kanagawa, Japan
Claims priority, application Japan, Dec. 23, 1969, 44/103,656
Filed Dec. 23, 1970, Ser. No. 100,940
Int. Cl. G05b *13/02*
U.S. Cl. 117—120       2 Claims

Upon sensing an abnormal coating condition, a memory automatically transmits a control signal representing normal coating conditions to the controller controlling coating operation and prevents the controller from receiving signals from the memory corresponding to abnormal coating conditions until such abnormal coating condition ceases.

BACKGROUND OF THE INVENTION

Field of the invention

The present invention relates to a method of coating by delaying the control signal controlling the quantity of coating material applied to a paper web or the like.

Description of the prior art

In conventional methods of coating, the measured value of the thickness or quantity of the coated material on the paper widely varies during times of joining the paper ends where the base to be coated is a web-like paper or the like. At the time of starting of the web coating machine after joining the paper ends, the input to the coating controller widely varies. This is explained as follows: for example, since the abnormal input signal occurs during the paper joining activity, the control signal is integrated during the time, and the control input signal generated at the time of the subsequent start of the machine is transitionally unstable. During the above time, the thickness of the coated material exceeds or is short of the desired thickness resulting in substandard articles.

SUMMARY OF THE INVENTION

The principal object of the present invention is to provide a method of delaying the control of a coating process in which the measured value of the thickness of the coated material at the time of abnormal condition is not transmitted to the thickness controller so that an abnormal amount of coating material is not coated on the web.

Another object of the present invention is to provide a method of delayed control of a coating operation in which the normal or standard thickness of the coated material on the web is memorized in the coating machine so that the memorized value of the thickness may be transmitted to the controller in the case where the paper feed operation is abnormal.

In accordance with the present invention, there is provided a method of delayed control of a coating machine equipped with a first controller and second controller defining a cascade control system for controlling the amount of the coated material. A memory is disposed between said first controller and second controller. The output signal of the first controller is transmitted to said memory and said second controller so that the memory may memorize the output signal at definite intervals and second controller controls the coating machine by the output signal thereof under normal conditions. Any abnormal signal is transmitted from the coating machine to said first controller and said memory at a time of abnormal condition such as the time when the paper end comes to the coating machine or the paper is to be joined at the ends thereof, so that the switches S and $S_1$ in said memory are switched over to give the memorized value to said second controller as the value of the control signal and change the output circuit of the first controller to make the output equal to the output before the abnormal condition regardless of the actual input into the first controller $C_1$. The circuit then recovers smoothly to the original condition when the abnormal signal ceases, whereby abrupt variation of the output of the second controller is prevented.

BRIEF DESCRIPTION OF THE DRAWINGS

Other objects, features and advantages of the invention will be made apparent from the following description of the preferred embodiment of the invention taken in conjunction with the following description, in which:

FIG. 1 is a block diagram showing the coating thickness control loop in accordance with the conventional coating thickness controlling method.

FIG. 2 is a block diagram showing the control loop of the thickness controlling device in accordance with an embodiment of the present invention.

FIG. 3 is a block diagrammatic representation of the coating device in accordance with another embodiment of the invention in which a mechanism for setting a memorizing value from outside is provided.

FIG. 4 is an explanatory view showing a memorized signal generating device employed in the embodiment of the invention.

FIG. 5 is an explanatory view showing the level of the output of the memory employed in the present invention.

DESCRIPTION OF THE PREFERRED EMBODIMENT

Now referring to the drawing, the present invention will be described in detail.

In FIG. 3, the reference character $C_1$ refers to a first controller, M is a memory, $C_2$ is a second controller, S and $S_1$ are switches in the memory, $Sa$ and $Sb$ are switch contacts of the switch S, and D is the coating machine to be controlled. The reference numeral 1 refers in FIG. 3 to a setting signal for controlling the amount of the coating material, 2 is a feed back signal of the amount of the coating material, 3 is an output signal of the first controller, 4 is a signal representing an abnormal amount of the coating material, the reference character E indicates a timer, 5 is an abnormal signal which does not pass through the timer E, 6 is an input abnormal signal into the memory M, 8 is a control setting signal of the second controller, 9 is a signal for controlling the output of the first controller $C_1$ from outside, 10 is the output signal of the second controller, and the reference numeral 11 is a feed back signal transmitted to the second controller $C_2$ from the coating machine D.

FIG. 4 shows the operation of the memory M in which the value of the output signal 3 of the first controller $C_1$ is first memorized in memory section A and then transferred to memory section B after a definite time. At the time when the signal memorized in the memory section A is transferred into memory section B, a new signal 3 is memorized in the memory section A. The memorized values are shown in FIG. 5, in which the ordinate represents the level of the output signal 3 of the first controller and the abscissa represents time. For instance, at the time of $t_1$, the memory section A memorizes the output signal 3 of $A_1$ generated from the first controller $C_1$, and at the time of $t_2$ the signal $A_1$ is transferred to the memory section B and the output signal 3 of $B_1$ at this time is memorized in memory section A. This operation is repeated thereafter, as shown in FIG. 5. Then, when the abnormal signal 6 passing through the timer E is transmitted into the memorizing device M, the signal in the memory section B, that is the signal memorized in the memory at a time one step before the abnormal condition started, is made to serve as the setting or control signal 8 of the second controller $C_2$. Then, the memorized signal is maintained therein until the abnormal signal 6 ceases.

The first controller $C_1$ is designed so that the output signal thereof can be changed into a definite signal regardless of the input signal thereto which is the feed back signal from the coating machine D, by the operation of the abnormal signal 5 introduced from outside without passing through the timer 5. The first controller $C_1$ is further designed so as to be switched to its original condition smoothly without making abrupt variations in the output signal thereof.

The output signal 3 of the first controller $C_1$ is transmitted to the second controller $C_2$ directly and at the same time to the memory M under the normal condition.

In operation, when the abnormal signal 4 caused by the paper breaking or the like is generated, the output signal 3 from the first controller $C_1$, before the abnormal signal is generated, is maintained in the memory M, and this memorized signal is transmitted to the second controller $C_2$ by the operation of the switches S and $S_1$ in which the switch contact Sa is closed and the switch $S_1$ is opened. Thus, the setting or control signal 8 of the second controller $C_2$ is prevented from varying due to an abnormal condition of the web and the like. And at the same time, the abnormal signal 5 makes the first controller $C_1$ stop the automatic controlling operation thereof (that is, the output circuit changes to a manual mode) and the output signal is changed into a signal of the level set by the output signal from the memory M.

When the system recovers from abnormal condition and the abnormal signal 4 of the amount of the coated material is removed, the first controller $C_1$ recovers its automatic control condition without making any abrupt variation in the output signal, and accordingly, the second controller $C_2$ is not affected to abruptly vary the setting or control signal thereof even if the output of the first controller $C_1$ is returned to its normal state by the operation of the memory M in which the switch S closes the contact Sb. Thus, the controlling operation of the device is prevented from becoming unstable. When the abnormal signal 4 disappears, the abnormal signal 6 also disappears after a definite time and the switch $S_1$ is closed. With the switch S closed at the contact Sb, a normal output signal 3 is transmitted to the memory and the second controller $C_2$.

Since the device in accordance with the present invention is constructed as described above, there are advantages as follows when the invention is employed.

First, even when the paper is broken or paper feed is stopped for joining web ends thereof, the output of the thickness meter indicating the thickness of the coated material before the paper breaking and the like is memorized in a memory means and the memorized value is transmitted to the second controller. Accordingly, the setting or control signal, that is, the controlling signal of the second controller is prevented from varying widely due to the abnormal signal generated by the coating machine.

Second, since the automatic controlling operation of the first controller is stopped by an abnormal signal from the coating machine at the time of paper break or the like (that is, the output circuit is changed to manual mode) and the output signal is switched to the definite valued signal set by the output signal from the memory, the first controller is returned to its normal automatic controlling situation when the abnormal condition and the abnormal signal disappears. The first controller returns to its normal condition without making an abrupt variation in the output signal, and the controlling signal of the second controller is not varied abruptly even when the output of the first controller is returned to its normal state. Thus, the controlling operation of the device is prevented from becoming unstable.

Third, since the amount of the coating material is always correctly controlled as a composite result of the above stated results, substandard articles are prevented from being produced during the production process thereof according to the device of the invention and the waste of time is eliminated.

What is claimed is:

1. A method of delayed control of a coating machine equipped with a first controller and second controller of a cascade control system for controlling the amount of the coated material and a memory disposed between said first controller and second controller, said method comprising:

transmitting an output signal of the first controller to said memory and to said second controller so that the memory memorizes the output signal at definite time intervals and second controller controls the coating machine by its output signal thereof under normal conditions, transmitting any abnormal signals from the coating machine to said first controller and said memory at the time of creation of an abnormal condition and feeding the memorized value in said memory before the abnormal condition occurred to said second controller as a controlling value and changing the output of the first controller into a circuit which makes the output equal to the output before the abnormal condition starts regardless of the actual input into the first controller, and allowing the circuit to recover to its original condition smoothly when the abnormal signal ceases, whereby abrupt variation of the control signal output of the second controller is prevented.

2. The method as claimed in claim 1, wherein said memory includes first and second memory sections and said method includes transferring said input signal stored in said first memory section to said second memory section and transmitting the output of the second memory section to said second controller.

References Cited

UNITED STATES PATENTS

| | | | |
|---|---|---|---|
| 3,562,500 | 2/1971 | Grant | 235—151.35 X |
| 3,596,071 | 7/1971 | Doering | 118—8 X |
| 3,609,325 | 9/1971 | McCarty | 235—151.35 X |
| 3,650,891 | 3/1972 | Dahlin | 235—151.1 |

MORRIS KAPLAN, Primary Examiner

U.S. Cl. X.R.

117—DIG. 2; 118—8, 11; 235—151.1, 151.3